United States Patent [19]
Doran

[11] Patent Number: 5,911,124
[45] Date of Patent: Jun. 8, 1999

[54] METHOD AND APPARATUS FOR APPLYING ECHO MITIGATION IN A COMMUNICATION DEVICE

[75] Inventor: Patrick J. Doran, Plantation, Fla.

[73] Assignee: Motorola, Inc., Schaumburg, Ill.

[21] Appl. No.: 08/794,696

[22] Filed: Feb. 3, 1997

[51] Int. Cl.⁶ .................................................. H04B 3/20
[52] U.S. Cl. .......................................... 455/570; 379/410
[58] Field of Search .................................. 455/570, 569, 455/575, 69, 88, 277.2, 303, 306; 370/410, 411, 406, 407, 286–289; 379/410

[56] References Cited

U.S. PATENT DOCUMENTS

| | | | |
|---|---|---|---|
| 3,659,050 | 4/1972 | Carlsson et al. | 179/1 |
| 4,178,488 | 12/1979 | Nishihata | 179/100 |
| 4,237,448 | 12/1980 | Weinberg | 340/311 |
| 4,578,819 | 3/1986 | Shimizu | 455/277.2 |
| 4,647,722 | 3/1987 | Nishida et al. | 379/63 |
| 5,359,656 | 10/1994 | Kim | 379/406 |
| 5,406,588 | 4/1995 | Birchler et al. | 375/346 |
| 5,440,582 | 8/1995 | Birchler et al. | 375/227 |
| 5,469,465 | 11/1995 | Birchler et al. | 375/346 |
| 5,696,847 | 12/1997 | Trew | 382/254 |

*Primary Examiner*—Salvatore Cangialosi
*Attorney, Agent, or Firm*—Andrew S. Fuller

[57] ABSTRACT

A communication device (200) includes apparatus (210) that selectively applies echo cancellation in the processing of an audio signal (207). The audio signal is processed for echo cancellation, and a modified audio signal obtained (410, 420, 430). The energy content of the modified audio signal is compared (440, 450) with that of the original audio signal. When the energy content of the modified audio signal exceeds that of the original audio signal, the unmodified audio signal is selected instead of the modified audio signal for further processing (450, 460, 470).

9 Claims, 3 Drawing Sheets

METHOD AND APPARATUS FOR APPLYING ECHO MITIGATION IN A COMMUNICATION DEVICE

TECHNICAL FIELD

This invention relates in general to communication devices, and more particularly, to communication devices requiring echo cancellation.

BACKGROUND OF THE INVENTION

Communication devices, such as portable radio telephones, which offer duplex communications often suffer from an acoustic feedback problem commonly referred to as echo. Echo generally occurs when audio sourced at a first communication unit is received by a second communication unit which audio is then retransmitted by the second communication unit to the first communication unit after an appreciable amount of delay. One of the most effective ways to suppress echo is to decouple the audio received and outputted at a particular communication device from the audio transmitted by that device. The prior art describes a variety of mechanical, electrical, and software solutions which attempt to adequately address this issue. Many practical implementations involve a combination of mechanical design and signal processing in an attempt to suppress the effects of echo.

FIG. 1 shows one prior art approach for an echo canceller 100 where signal processing is used to account for the presence of echo resulting from the coupling of an audio output signal 102 into an audio input signal 104. Here, the audio output signal 102 is sampled and used by a least mean squared (LMS) error adaptive filter 106 to remove echo energy from the audio input signal. The resultant filtered signal 108 substitutes for the original audio input signal 104, as it is expected to be superior to the original audio input signal 104.

One problem with this prior art implementation is that the LMS algorithm used can occasionally produce a worse signal by amplifying echo or by amplifying noise. This may occur when the echo canceller adapts its filter using noisy audio output signals or when the echo canceller attempts to filter an input signal which is uncorrelated with the audio output signal. Thus, the resultant filtered signal may be inferior to that of the original signal.

It is desirable to provide an echo cancellation technique which overcomes the problems discussed with respect to the prior art. Preferably, a solution should be provided which is not computationally intensive yet which produces significant improvements.

DETAILED DESCRIPTION OF THE PREFERRED EMBODIMENT

The present invention provides for the application of echo cancellation or mitigation in a communication device. An audio signal is processed to apply echo cancellation or mitigation techniques, and a modified audio signal is obtained. Ordinarily, the audio signal represents an input signal from a microphone or other audio input device. The audio input signal is preferably processed by an adaptive filter, which attempts to remove the contribution of an audio output signal corresponding to an output device expected to be the source of the echo. A selection is made between the unmodified audio signal and the modified audio signal based on a comparison of respective energy content as determined from samples of the unmodified audio signal and corresponding samples of the modified audio signal. Preferably, when the energy content of the modified audio signal exceeds that of the unmodified audio signal it is assumed that there is no improvement to be gained by using the modified audio signal, and the unmodified audio signal is selected instead. This determination represents a significant improvement over prior art implementations that tend to ignore potential deterioration of an audio signal when processed for echo cancellation.

Figure 1:
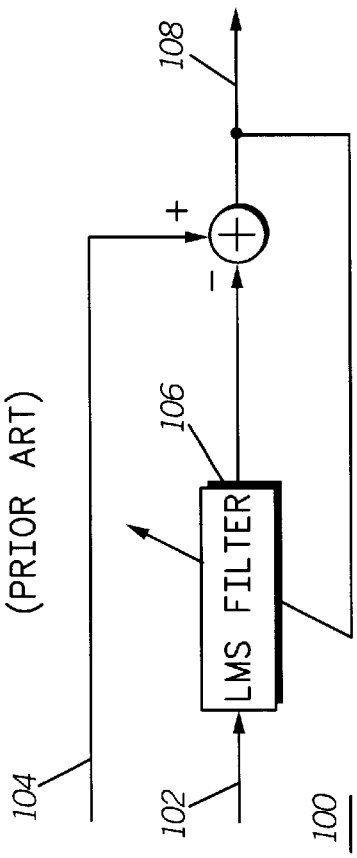
FIG. 1 is a block diagram depicting a prior art echo cancellation implementation.
Figure 2:
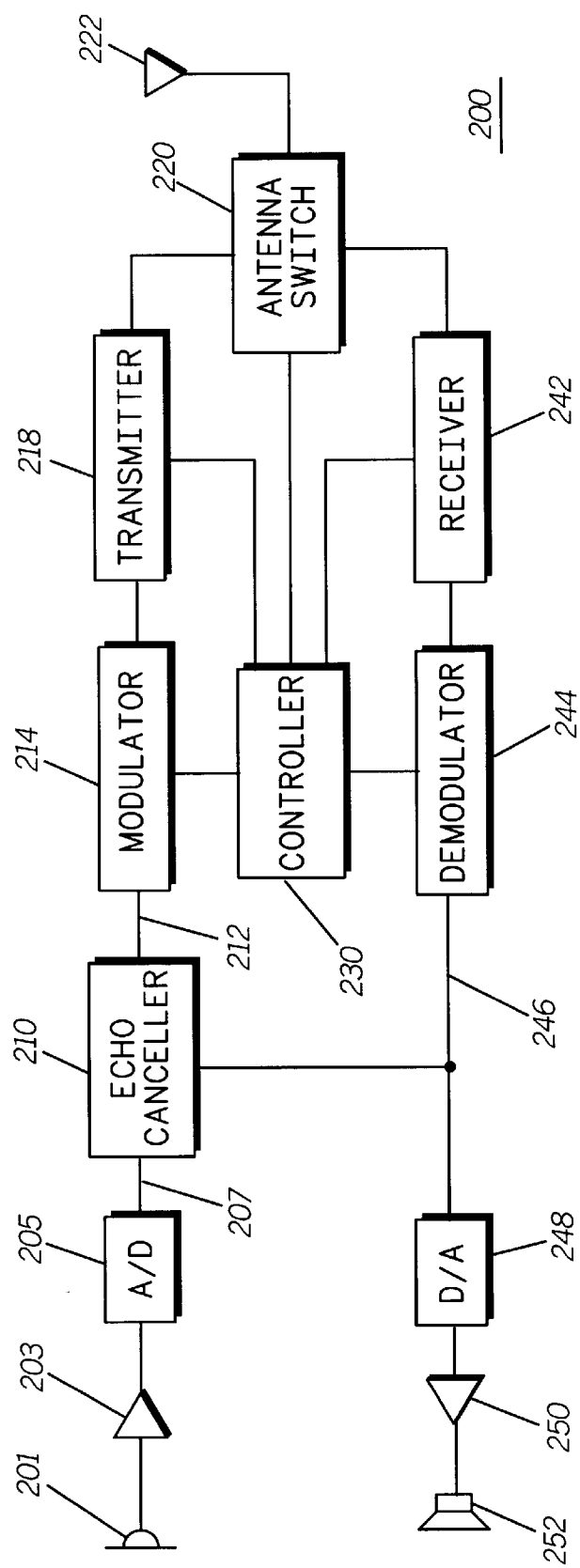
FIG. 2 is a block diagram of a radio communication device incorporating an echo cancellation application technique, in accordance with the present invention.

Referring now to FIG. 2, there is shown a block diagram of a communication device 200, in accordance with the present invention. In the preferred embodiment, the communication device 200 is a portable radio telephone with full duplex communication capability. However, the principles of the present invention have wider applicability to other equipment having an audio input device located in close proximity with an audio output device, where acoustic feedback or coupling problems occur.

The radio telephone 200 is operable to transmit and receive audio signals, such as voice communications. For voice transmissions, the radio telephone 200 includes a microphone 201 which is coupled to pre-amplifier 203. The pre-amplifier 203 is coupled to an analog-to-digital (A/D) converter 205, which provides an audio input signal 207 to an echo canceller 210. The echo canceller 210 provides an output signal 212 that is coupled a modulator 214. The modulator 214 is coupled to a transmitter 218 which is selectively coupled to an antenna 222 via an antenna switch 220.

For receive operations, the antenna 222 is selectively coupled via the antenna switch 220 to a receiver 242, for the receipt of a wireless communication signal. The receiver 242 is coupled to a demodulator 244, which processes the communication signal to generate an audio output signal 246. The audio output signal 246 is coupled to a digital-to-analog (D/A) converter 248, which is coupled to through an amplifier 250 to a speaker 252. The audio output signal 246 is also coupled to the echo canceller 210. The controller 230 is coupled to the modulator 214, the transmitter 218, the antenna switch 220, the receiver 242, and to the demodulator 244, to provide overall operational control of the radio telephone 200.

According to the present invention, the radio telephone operates to reduce the effects of echo distortion for audio signals sourced at the microphone 201. For example, the audio input signal 207 may have echo distortion caused by acoustic feedback from the speaker 252. In the preferred embodiment, the echo canceller 210 attempts to remove such echo distortion by filtering the audio input signal 207 using samples of the audio output signal 246.

Figure 3:
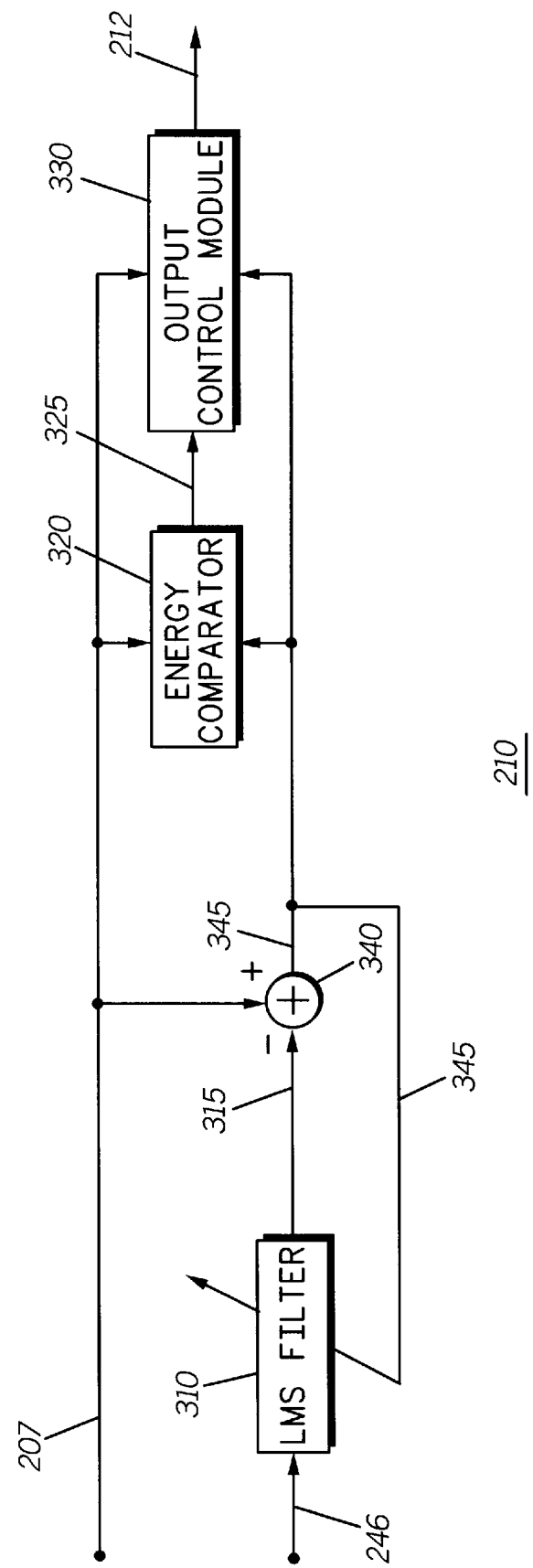
FIG. 3 is a block diagram highlighting functional components of an echo canceller, in accordance with the present invention.

FIG. 3 is a block diagram highlighting functional blocks of the echo canceller 210, in accordance with the present invention. The functions described herein is preferably implemented using a digital signal processor. The echo canceller 210 includes an adaptive filter, such as a LMS error adaptive filter 310, an energy comparator 320, an echo canceller output control module 330, and a summer 340. In operation, the audio input signal 207 is coupled to the summer 340, to the energy comparator 320, and to the output control module 330. The audio output signal 246 is coupled to the LMS filter 310, which has an output 315 coupled to the summer 340. The summer 340 combines the output 315 of the LMS filter 310 with the audio input signal 207 to generate a modified audio signal or echo filtered signal 345. The echo filtered signal 345 is fed back to the LMS filter 310 to provide an adaptive operation. The energy comparator 320 operates on energy estimates obtained from corresponding samples of the audio input signal 207 and the echo filtered signal 345 to generate a control signal 325 for the output control module 330. The output control module 330 uses the control signal 325 to select one of the unmodified audio input signal 207 and the echo filtered signal 345, to present as the echo canceller output signal 212 for further signal processing.

Figure 4:
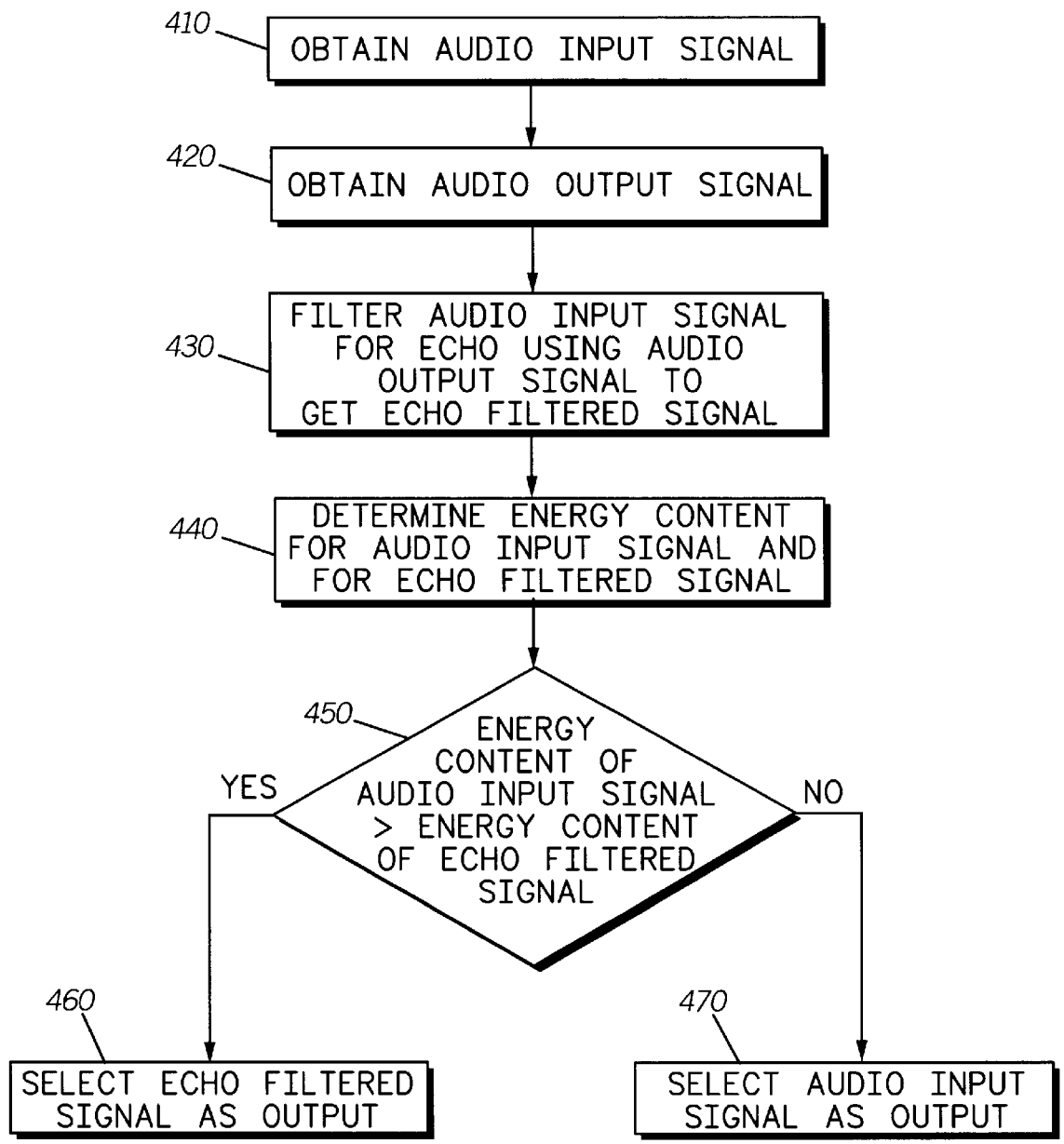
FIG. 4 is a flowchart of procedures describing operation of the echo canceller of FIG. 3, in accordance with the present invention.

FIG. 4 shows a flowchart of procedures 400 for application of echo mitigation or cancellation, in accordance with the present invention. An audio input signal is obtained from an audio input device, such a microphone, step 410. In the preferred embodiment, the audio input signal is obtained as digital information by sampling signals sourced from a microphone, and is organized into frames of information. An audio output signal is also obtained which is preferably in digital form, step 420. Ordinarily, a communication signal is received over a wireless communication channel, and processed to generate the audio output signal. The audio input signal is then filtered for echo suppression or mitigation using the audio output signal, thereby generating an echo filtered signal, step 430.

Preferably, the audio output signal is coupled to an adaptive filter and is used to adjust for echo in the audio input signal. The resultant echo filtered signal is expected to be correlated with the audio input signal such that the filtering produces an improved signal over the original audio input signal. However, the present invention accounts for situations in which the echo filtered signal represents a degradation with respect to the audio input signal, because of lack of correlation between the audio input signal and the audio output signal, or for other reasons. Thus, the echo canceller determines energy content for corresponding portions of the audio input signal and the echo filtered signal, step 440, in order to select the superior signal.

In the preferred embodiment, the audio input signal is processed into frames of digital data, and the selection of the superior signal for echo cancellation purposes is done on a frame by frame basis. Accordingly, an energy content estimate is determined for a frame of the audio input signal, and for a corresponding frame of the echo filtered signal. When the energy content of the frame of echo filtered signal exceeds the energy content of the corresponding frame of the audio input signal, it is assumed that the echo filtered signal does not represent an improvement over the original audio input signal; therefore, the original audio input signal is selected as the echo canceller output, steps 450, 470. However, when the energy content of the audio input signal exceeds the energy content of the echo filtered signal, it is assumed that the echo filtered signal represents an improvement and therefore the echo filtered signal is selected as the echo canceller output, steps 450, 460. In the preferred embodiment, the echo canceller output, i.e., the echo filtered signal or the unmodified audio input signal, is processed for transmission over a wireless communication channel.

The present invention provides for significant advantages over the prior art. A determination is made whether an echo filtered signal represents an improvement over an original audio input signal, and the superior signal selected using energy content as a decision criteria. The results in enhanced performance in the application of echo cancellation signal processing without a substantial increase in computational requirements.

What is claimed is:

1. A method processing an audio signal, comprising the steps of: processing the audio signal for echo cancellation to obtain a modified audio signal; and selecting as an echo cancellation output one of the audio signal and the modified audio signal based on a comparison of energy content determined from samples of the audio signal and energy content determined from samples of the modified audio signal.

2. The method of claim 1, wherein the step of selecting comprises the steps of:

selecting the modified audio signal as the echo cancellation output when the energy content determined from samples of the audio signal exceeds the energy content determined from samples of the modified audio signal; and selecting the audio signal as the echo cancellation output when the energy content determined from samples of the modified audio signal exceeds the energy content determined from samples of the audio signal.

3. The method of claim 2, wherein the step of processing comprises the steps of:

deriving the audio signal from an audio input device;

obtaining a device output signal corresponding to an audio output device in close proximity to the audio input device; and adaptively filtering echo from the audio signal using the device output signal to generate the modified audio signal.

4. A method of echo cancellation in a communication device operable to communicate over a wireless channel, the communication device having an audio output device and an audio input device, the method comprising the steps of:

receiving a communication signal over a wireless communication channel;

processing the communication signal to generate an audio output signal;

coupling the audio output signal to an adaptive filter for filtering echo signals;

obtaining an audio input signal from the audio input device;

filtering the audio input signal with the adaptive filter to obtain an echo filtered signal;

determining energy content for the audio input signal and for the echo filtered signal;

transmitting the echo filtered signal over the wireless communication channel when the energy content of the audio input signal exceeds the energy content of the echo filtered signal;

and transmitting the audio input signal over the wireless communication channel when the energy content of the echo filtered signal exceeds the energy content of the audio input signal.

5. A method, comprising the steps of:

obtaining a first audio signal;

obtaining a second audio signal; filtering the first audio signal by using the second audio signal to adjust for echo in the first audio signal, to obtain an echo filtered signal;

determining energy content for the first audio signal and for the echo filtered signal;

selecting the echo filtered signal as an echo cancellation output when the energy content of the first audio signal exceeds the energy content of the echo filtered signal; and selecting the first audio signal as an echo cancellation output when the energy content of the echo filtered signal exceeds the energy content of the first audio signal.

6. The method of claim 5, wherein the first audio signal comprises a signal sourced by an audio input device and the second audio signal comprises a signal coupled to an audio output device.

7. A communication device, comprising:

an audio input device having an output of an audio input signal;

an audio output device having an input of an audio output signal;

an echo canceller coupled to the audio input signal and to the audio output signal, comprising:

a filter having an input coupled to the audio input signal and to the audio output signal, and having an output of an echo filtered signal;

an energy comparator coupled to the echo filtered signal and to the audio input signal; and an echo canceller output control module coupled to the echo filtered signal and to the audio input signal, and responsive to energy comparator to output the echo filtered signal when the audio input signal has an energy content that exceeds that of the echo filtered signal, and to output the audio input signal when the echo filtered signal has an energy content that exceeds that of the audio input signal.

8. The communication device of claim 7, wherein the filter comprises an adaptive filter.

9. The communication device of claim 8, wherein the filter comprises a least mean squared error adaptive filter.

* * * * *